Oct. 29, 1940.   W. R. McDONALD   2,219,692
HEART-BEAT RECORDING SCALE
Filed Feb. 10, 1939
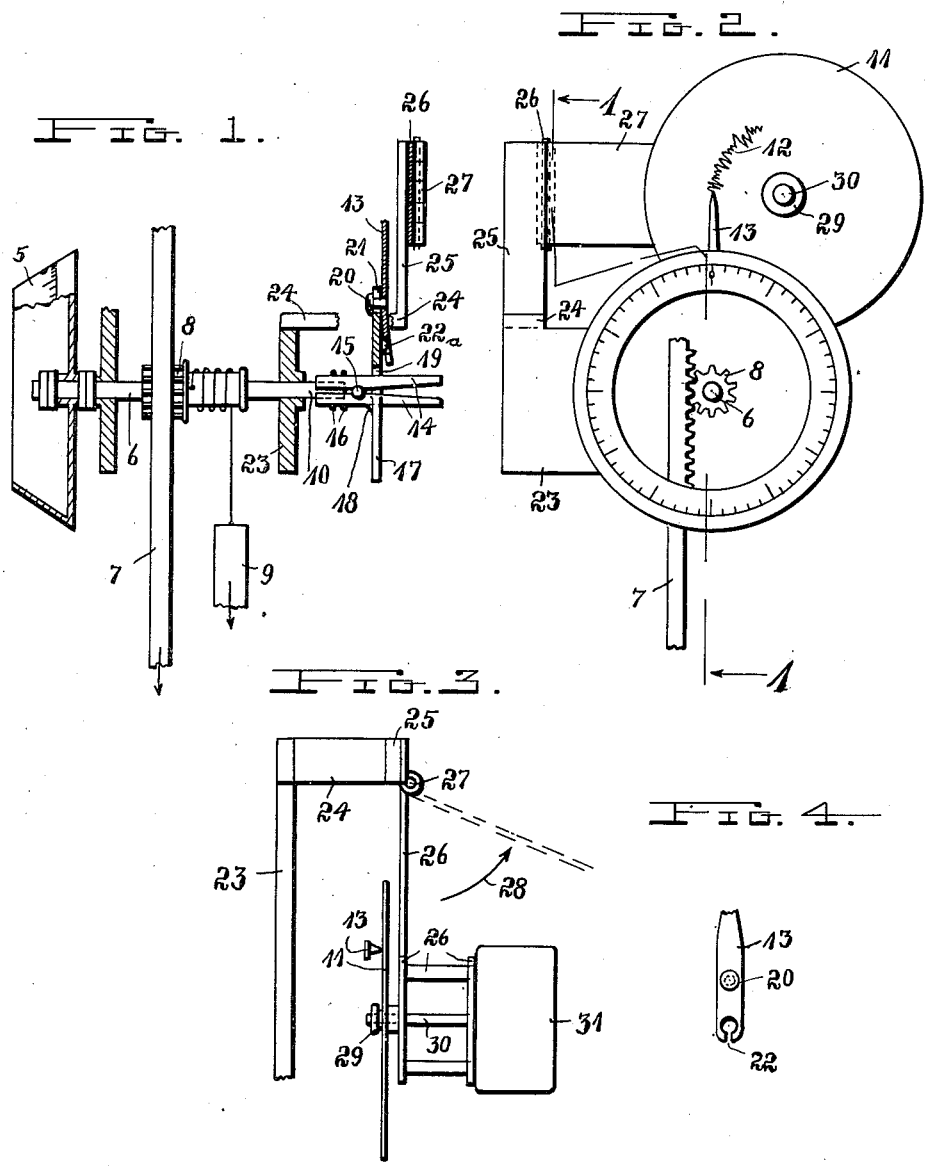
WILLIAM R. McDONALD,
INVENTOR.
BY Otto R. Ringer,
HIS ATTORNEY.

Patented Oct. 29, 1940

2,219,692

UNITED STATES PATENT OFFICE 2,219,692

HEART-BEAT RECORDING SCALE

William R. McDonald, Los Angeles, Calif.

Application February 10, 1939, Serial No. 255,704

2 Claims. (Cl. 234—5.6)

This invention relates to machines that will come to a vibrating balance while sustaining the weight of a person.

One of the objects of this invention is to provide such machines with means by which the heart-beat of a person may be recorded on a chart.

Another object is to utilize the very slightly vibrating movements of the scale, due to the beating of the heart of the person whose weight is being taken, for the recording.

Another object is to make the charts exchangeable and easily accessible.

Another object is to provide easily accessible chart-marking means.

Another object is to provide setting and adjusting means for the chart-marking device whereby the marking may be procured at suitable and desirable points in the chart, regardless of the movement of the weight-indicating mechanism.

Another object is to provide means for replacing the marking means and replenishing the marking medium.

Other objects will appear from the following description and appended claims as well as from the accompanying drawing, in which—

Fig. 1 is a fragmentary vertical section through a scale mechanism, including parts for recording the movements according to this invention.

Fig. 2 is a fragmentary front elevation of the mechanisms of Fig. 1.

Fig. 3 is a fragmentary top view of the motor-drive for the recording parts shown in relative position with respect to the swingable support, connecting with the frame of the scale mechanism.

Fig. 4 is a fragmentary front view of the detachable end of the recording pen.

The principal operating and supporting parts of a scale are generally mounted on sharp-edged and extremely hard bearings, to assure a most frictionless movement, and, if all parts, including rotating dial-shafts, are mounted carefully, there can be no doubt that the slightest movement of a person, while on a scale, reflects in the indications of the dial.

With a finely adjusted and balanced machine, a mere talking, which is naturally only an exertion of the respiratory tract, will cause a vibration of the dial indications.

With this in mind, it can readily be realized that the regular heart-beat of the person on the scale may be utilized for recordations by means of a scale, depending only on a carefully designed arrangement.

An arrangement that has been found to operate quite satisfactorily is illustrated in the drawing in a rough outline and merely as to the principal parts.

A simple dial 5 is mounted on the shaft 6, by which the weight of a person may be ascertained at a glance.

The rack-bar 7 serves to connect operatively with the parts in the platform upon which a person stands, being merely shown as a simple means by which the shaft 6 may be actuated, though different scales have different sorts of connecting means between the dial and platform.

In this form, the rack-bar 7 engages with the pinion 8 for rotating the shaft 6 by any movements of the bar 7.

In cases where the rack-bar or any other parts of the machine cannot be balanced otherwise, a counter-balancing weight 9 is provided.

The weight-indicating mechanism so far set forth should be of light construction and well balanced, so as to quickly and easily follow the slightest vibrating influences on the scale platform.

Besides the weight-indicating mechanism, with its dial, a recording chart is provided, for furnishing visible and permanent indications of any variations of influences by the person on the scale during a certain period.

Such a chart may be of any form to be had on the open market, or may be of a special design and make, divided on its face by lines to indicate suitable fractions of any certain period.

In case that such a chart is, for instance, in form of a round sheet of paper, it may be divided by radial lines into evenly proportioned spaces to represent the sixty seconds of one minute, so that one revolution of the chart may mean the passing of one minute, and any marks made may indicate certain variations during that minute or during any of the seconds of that minute.

Letting 11 designate such a chart in Figs. 2 and 3 of the drawing, certain vibrations-indicating lines 12 may be produced while the chart is being rotated, to appear as indicated in Fig. 2.

For producing the lines 12 a writing means 13 is provided on the end 10 of the shaft 6 for transmitting any vibrations of the weight-indicating mechanism to the chart 11.

Inasmuch as the weight-indicating mechanism may move to cause the shaft 6 to rotate to many different positions, the writing means is preferably applied adjustably to the shaft, so that the writing point of the writing means may be brought at will to any desired position on the chart for a proper showing.

As shown, a split hub-portion 14 is provided with a pivot 15 about which the two halves of the split hub-portions can be manipulated so that they can be spread sufficiently to easily slip about the shaft end 10, the halves being held together and in engagement with the pivot by means of the spring 16, which serves at the same time to clamp the hub-portion to the shaft end when released by the manipulating hand.

For instance, the hub can be held free of engagement while the scale mechanisms are operating until the dial mechanisms have come to about a steady indicating position, when the hub is released in a position to bring the writing means to the desired position on the chart.

The base-portion 17 of the pen arm 13 is firmly secured to one of the hub-portions, as indicated at 18, there being a large enough hole 19 so that the opposite hub-portion may swing freely about the pivot and with respect to the secured half of the hub.

Inasmuch as the writing means is to be refilled cleaned, and otherwise to be handled eventually, the outermost portion of the pen arm is preferably made detachable with respect to the base-portion 17, a simple arrangement being indicated in Figs. 1 and 4, a headed pin 20 being designed to engage in a slot 21 of the base-portion 17, while the slotted end 22 of the writing means 13 will easily settle over the head 22 on the base-portion.

This arrangement allows a removal and exchange of the writing means 13 with respect to the base-portion 17 of the pen arm on the split hub.

Moreover, the writing means as well as the chart must easily be accessible and exchangeable, for which reason the chart is mounted swingably with respect to the other parts.

Designing a part of the frame or structure of the scale at 23, a bracket 24 extends therefrom rearwardly with an upwardly extending portion 25, to which the chart-structure, or chart supporting frame 26 is hingedly connected at 27, so that the whole chart-structure may swing in the direction of the arrow 28 in Fig. 3, to make chart and writing means easily accessible and exchangeable.

The chart is removably held by the nut 29 to the shaft 30 of the motor 31.

Having thus described my invention, I claim:

1. In a heart-beat indicating weighing machine, a weight-indicating mechanism capable of sensitive vibratory movements under the influence of heart beats of a person disposed on the machine, marking means for recording said vibratory movements, means for moving a chart in cooperative relation with said marking means, and releasable means for coupling said marking means to said weight-indicating mechanism, said releasable means being so constructed and arranged that the marking means may be held free from movement while the weight-indicating mechanism moves to balanced position and may be adjusted to engage a desired portion of the chart.

2. In a heart-beat indicating machine, a weight-influenced mechanism capable of sensitive vibratory movements under the influence of heart beats of a person disposed on the machine, marking means for recording said vibratory movements, and means for releasably coupling said marking means to said weight-influenced mechanism and so constructed and arranged that said marking means may be held free from movement while the weight-influenced mechanism moves to balanced position.

WILLIAM R. McDONALD.